United States Patent [19]

Okuno

[11] Patent Number: 4,630,119
[45] Date of Patent: Dec. 16, 1986

[54] SOUND DETECTING CIRCUIT
[75] Inventor: Kazuhiko Okuno, Itami, Japan
[73] Assignee: Mitsubishi Denki Kabushiki Kaisha, Tokyo, Japan
[21] Appl. No.: 535,094
[22] Filed: Sep. 23, 1983
[30] Foreign Application Priority Data
  Oct. 6, 1982 [JP] Japan .................. 57-177023
[51] Int. Cl.⁴ .............................. H04N 5/62
[52] U.S. Cl. ...................... 358/198; 358/143; 358/197
[58] Field of Search ............ 358/142, 143, 147, 166, 358/167, 36, 37, 196, 197, 198

[56] References Cited
U.S. PATENT DOCUMENTS
  3,590,143 6/1971 Narita .................. 358/198
  3,673,319 6/1972 Humphrey ............ 358/198
  4,396,946 8/1983 Meguro ................ 358/198
  4,470,070 9/1984 Griffis ................. 358/198

Primary Examiner—Tommy P. Chin
Attorney, Agent, or Firm—Sughrue, Mion, Zinn Macpeak & Seas

[57] ABSTRACT

A differential amplifier (10) used as an IF filter and placed between an IF amplifier (2) and a first sound detector (9) in a television system. The IF amplifier produces IF signals for a sound carrier and a picture carrier at separate frequencies. The differential amplifier has frequency characteristics such that the gain at the sound carrier frequency is larger than that at the picture carrier frequency and that the gain in the band between the sound carrier and the picture carrier is smaller than that at the picture carrier frequency. The mixing of the higher harmonics of the video component into the frequency of the difference between the frequency of the sound carrier and the frequency of the picture carrier is thereby decreased. The sound detector transforms the signal from the differential amplifier to a second sound intermediate frequency corresponding to this frequency difference, and, when demodulated to the sound signal, buzz sound is decreased and S/N is improved.

4 Claims, 5 Drawing Figures (b)

SOUND DETECTING CIRCUIT

BACKGROUND OF THE INVENTION

The present invention relates in general to a sound detecting circuit of a television receiver and in particular to an IF filter.

Ordinarily, in a television receiver, the signals from an antenna are transformed to an intermediate frequency (IF) by a tuner. For example, a picture carrier included in the intermediate frequency signal is transformed to 58.75 MHz and a sound carrier to 54.25 MHz. These transformed picture and sound carriers are supplied to an IF amplifier and after amplification to a predetermined level, the IF amplifier generates a second sound IF signal at a beat frequency, for example, 4.5 MHz between the IF picture carrier and the IF sound carrier. Namely, the sound carrier is frequency-transformed with the picture carrier acting as a local oscillator. This transformation is called the first sound detection. The second sound IF signal of 4.5 MHz is then FM-demodulated (in a second sound detection) to regenerate the original sound signal. As shown in FIG. 1(a), the IF signal is supplied to an IF amplifier 2 through an input terminal 1 and is amplified to a prescribed level. This amplified IF signal is then applied to a video detector 3 which simultaneously performs the video detection and the sound detection. Next, the 4.5 MHz signal is eliminated from the output of the video detector 3 by a trap circuit 4 tuned to the beat frequency of 4.5 MHz and the signal is output on a video output terminal 5. Since the output of the video detector 3 also includes the second sound IF signal of 4.5 MHz at the same time, this signal is extracted with a 4.5 MHz filter 6 which is output on a sound IF output terminal 7. The resultant circuit as shown in FIG. 1(a) is simple, but it suffers from disadvantages. The IF signal includes not only the picture carrier and the sound carrier but also a color subcarrier. This color subcarrier is also amplified and because of the nonlinearity of the video detector, an intermodulation is effected between these carriers. As a result, a so-called 920 kHz beat is generated. Consequently, in the case where more importance is attached to video quality than to sound quality, the sound carrier level in the IF signal at the input terminal 1 is lowered in order to decrease the 920 kHz beat. However, as a result the sound signal-to-noise ratio (S/N) disadvantageously decreases. For this reason, the circuit of FIG. 1(b) is used to overcome the defect of the circuit of FIG. 1(a). Between the IF amplifier 2 and the video detector 3, which is the main source of the 920 kHz beat, a sound carrier trap circuit 8 is provided to attenuate the 920 kHz beat of the video signal output. Also, the beat frequency at 4.5 MHz which is the difference between the picture carrier and sound carrier is obtained by inputting the IF amplifier output into a first sound detector 9.

Recently, sound multiplexing has been implemented and a strong demand has arisen not only for a high quality picture but also for high quality sound. Noise, the so-called buzz sound, and the sound S/N determined by the synchronous sound and video signals have consequently become important issues.

The conventional methods of FIGS. 1(a) and (b) do not produce satisfactory sound S/N and need to be improved. If a separate carrier method is used in which the sound signal system is separated from the video signal system and separate processing is performed, the problem of sound S/N is improved but this method had the disadvantage that the circuits become complicated and cost much more.

SUMMARY OF THE INVENTION

It is an object of the present invention to improve the sound S/N by use of a simple circuit.

It is another object of the present invention to provide a circuit suitable for semiconductor integration.

The foregoing and other objects are attained in the present invention of a sound detecting apparatus for a television system which comprises an intermediate frequency amplifier amplifying to a predetermined level a sound carrier signal and a picture carrier signal input from a tuner, a sound detector outputting a difference frequency between the sound carrier and the picture carrier, and a differential amplifier which is inserted between the intermediate frequency amplifier and the sound detector. The differential amplifier has a frequency characteristic such that its gain at the sound carrier frequency is larger than that at the picture carrier frequency and that the gain at frequencies between the picture carrier and the sound carrier is smaller than that at the picture carrier.

DETAILED DESCRIPTION OF THE PREFERRED EMBODIMENT

One embodiment of the present invention will hereafter be described with reference to the figures.

Figure 1:
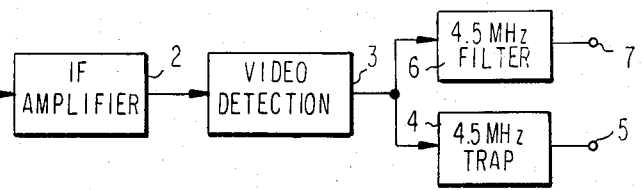
FIGS. 1(a) and 1(b) are block diagrams of conventional sound detecting apparatuses.
Figure 2:
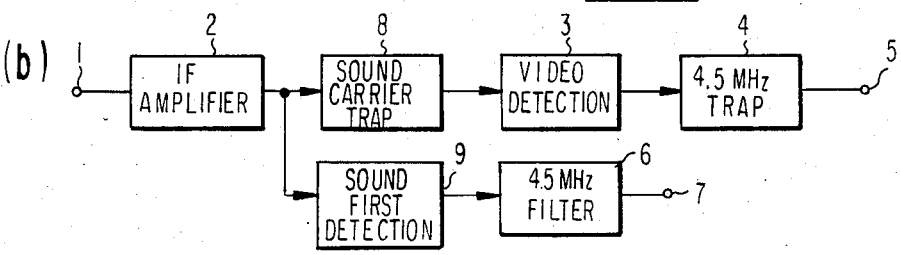
FIG. 2 is a block diagram illustrating one example of a sound detecting apparatus of this invention.
Figure 2:
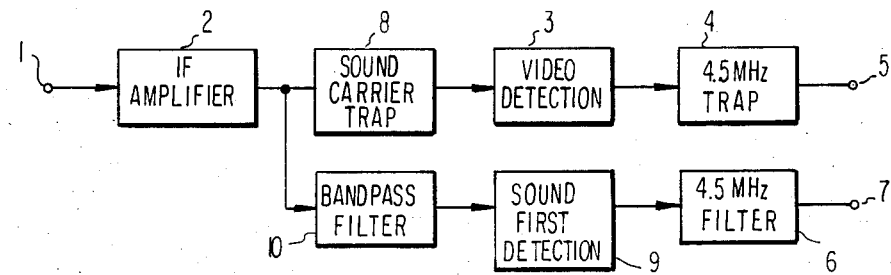
Figure 3:
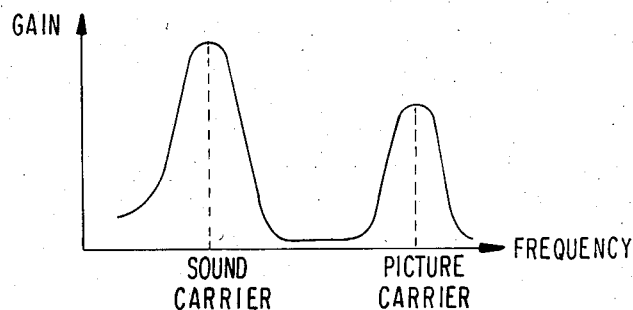
FIG. 3 is a frequency-gain characteristic of a bandpass filter used in a sound detecting apparatus of this invention.

FIG. 2 shows a block diagram of one embodiment of the present invention. In the figures, elements 1 to 9 are the same as those of the conventional apparatus shown in FIG. 1(b). But the crucial difference from FIG. 1(b) is that a differential amplifier is inserted as a bandpass filter 10 between the output of the IF amplifier 2 and the first sound detector 9.

In order to improve the buzz sound and S/N, this differential amplifier should have a frequency characteristic in the IF signal band such that its gain in the neighborhood of the sound carrier frequency is larger than that at the picture carrier frequency. Furthermore, in order to decrease the influence of the video component which is generated in the video detector 3, the gain at the lower side band of the picture carrier should be reduced. Specifically, the frequency characteristic should be made such that the ratio of the picture carrier to the sound carrier (generally, called the P/S ratio) of the input IF signal is reduced such that in the frequency band between these carriers, the gain is minimal.

Figure 4:
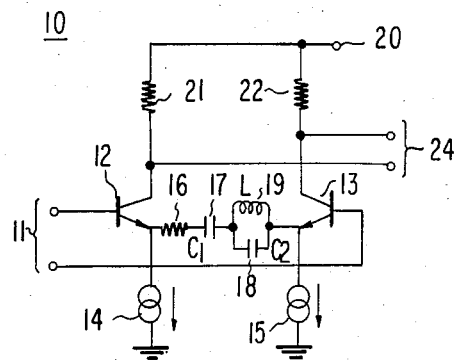
FIG. 4 is a circuit diagram illustrating a bandpass filter used in a sound detecting apparatus of this invention.

The present invention realizes such frequency characteristics by use of a differential amplifier. The circuit construction of the differential amplifier 10 is explained in the following paragraphs with reference to FIG. 4.

An IF signal from the IF amplifier 2 is input to the input terminals 11, from which it is thereafter input between the bases of two NPN transistors 12 and 13. Each emitter of the transistors 12 and 13 is connected to constant current sources 14 and 15, respectively, themselves connected to ground. A series connection circuit, which is composed of a resistor 16, and a series-parallel resonance circuit composed of a capacitor 17 in series with a capacitor 18 and a coil 19 in parallel, is connected between the emitters of the transistors 12 and 13. Load resistors 21 and 22 are connected between each collector of the transistors 12 and 13 and a power source terminal 20. The differential amplifier 10 is composed of the above elements. The output of this differential amplifier 10 is input to the first sound detector 9 from its output terminals 24. The gain of the differential amplifier 10 is determined by the resistor 16, the impedances of the capacitors 17 and 18 and of the coil 19, the emitter resistances of the transistors 12 and 13 and the load resistors 21 and 22. However, the frequency characteristics of the gain of the differential amplifier 10 is determined mainly by the impedance of the series-parallel resonance circuit. Thus, let the capacitance of the capacitor 17 be C1, the capacitance of the capacitor 18 be C2 and the inductance of the coil 19 be L. The impedance of said series-parallel resonance circuit becomes:

$$0, \text{ at the frequency of } f1, \text{ where } f1 = \frac{1}{2\pi\sqrt{L(C1 + C2)}}$$

$$\infty, \text{ at the frequency of } f2, \text{ where } f2 = \frac{1}{2\pi\sqrt{LC2}}$$

Figure 5:
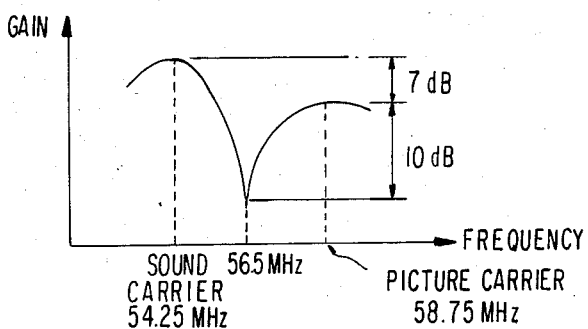
FIG. 5 is a frequency-gain characteristic of the bandpass filter illustrated in FIG. 4.

For example, let f1=54.25 MHz and f2=56.5 MHz and let the resistances of resistors 16, 21 and 22 be properly chosen values. Then, the frequency characteristics shown in FIG. 5 will be realized as the frequency dependance of the gain of this differential amplifier 10.

Thus, the gain at the sound carrier of 54.25 MHz which is input into the first sound detector 9 can be made larger than that of the video signal band by inserting the differential amplifier 10 of such a simple design. Therefore, the 4.5 MHz component of the first sound detector output 7 can be increased. Consequently, mixing of the higher harmonics of the video component due to the nonlinearity of the video detector 3 of FIG. 1(a) into the 4.5 MHz band can be lessened, particularly at 4.5/2 MHz, 4.5/3 MHz, etc. Therefore, according to the present invention, when demodulated to the sound signal, the buzz sound is less and particularly the S/N ratio from a weak transmitted signal is improved.

Needless to say that the invention is useful for an IF band not only of 58 MHz, but also for a 45 MHz or 38 MHz band.

As mentioned above, according to the present invention, a high-quality sound signal can be regenerated in a simple circuit by inserting a differential amplifier having advantageous frequency-gain characteristics for sound detection between the IF amplifier and the first sound detector. Furthermore, this circuit has the advantage of being suitable for semiconductor integration.

What is claimed is:

1. A sound detecting apparatus for a television system, comprising:
    an intermediate frequency amplifier (2) amplifying to a predetermined level in a first IF output signal a sound carrier signal at a sound carrier frequency and a picture carrier signal at a picture carrier frequency, said sound and picture carrier frequencies being respective intermediate frequencies;
    a differential amplifier (10) receiving said first IF output signal and including amplifying means for amplifying into a second IF output signal a portion of said first IF output signal at said picture carrier frequency at a first gain level, a portion of said first IF output signal at said sound carrier frequency at a second gain level higher than said first gain level, and a portion of said first IF output signal at frequencies between said picture carrier frequency and said sound carrier frequency at third gain levels lower than said first gain level; and
    a detector (9) receiving said second IF output signal and outputting signals including a beat signal at a difference frequency which is the difference between said sound carrier frequency and said picture carrier frequency.

2. A sound detecting apparatus according to claim 1, wherein said amplifying means comprises:
    a first transistor (12);
    a second transistor (13);
    means for applying said first ID output signal from said intermediate frequency amplifier across based of said first and second transistors;
    a power source (20);
    resistors (21, 22) which are each connected separately between said power source and the collector of one of said first and second transistors;
    two constant current sources (14, 15) each connected separately between ground and the emitter of one of said first and second transistors;
    a resonance circuit being connected between the emitters of said first and second transistors; and
    means for applying to said detector a signal, being said second IF output signal, arising between collectors of said first and second transistors to produce said beat signal in said detector.

3. A sound detecting apparatus according to claim 2, wherein said resonance circuit comprises a series circuit which is composed of a resistor (16) and a capacitor (17), and in series therewith a parallel resonance circuit further comprising a coil (19) and a capacitor (18).

4. A sound detecting apparatus according to claim 3, wherein said difference frequency substantially equals 4.5 MHz.

* * * * *